United States Patent [19]

Shikakura

[11] Patent Number: 5,566,002
[45] Date of Patent: Oct. 15, 1996

[54] IMAGE CODING/DECODING METHOD AND APPARATUS

[75] Inventor: Akihiro Shikakura, Kawasaki, Japan

[73] Assignee: Canon Kabushiki Kaisha, Tokyo, Japan

[21] Appl. No.: 459,476

[22] Filed: Jun. 2, 1995

Related U.S. Application Data

[63] Continuation of Ser. No. 872,304, Apr. 23, 1992, abandoned.

[30] Foreign Application Priority Data

Apr. 25, 1991 [JP] Japan .................................. 3-095516

[51] Int. Cl.$^6$ .................................................. H03M 7/00
[52] U.S. Cl. .................. 358/433; 358/427; 358/261.4; 358/539
[58] Field of Search .................................... 358/518, 520, 358/523, 425, 426, 261.1, 261.3, 427, 261.4, 432, 433, 539, 443

[56] References Cited

U.S. PATENT DOCUMENTS

| | | |
|---|---|---|
| 4,580,162 | 4/1986 | Mori . |
| 4,651,194 | 3/1987 | Grallert et al. . |
| 4,745,473 | 5/1988 | Hall . |
| 4,894,713 | 1/1990 | Delogne et al. . |
| 4,920,426 | 4/1990 | Hatori et al. . |
| 4,933,763 | 6/1990 | Chantelou . |
| 4,982,290 | 1/1991 | Nishi et al. . |
| 5,019,894 | 5/1991 | Hieda . |
| 5,023,710 | 6/1991 | Kondo et al. . |
| 5,150,432 | 9/1992 | Ueno et al. . |
| 5,276,525 | 1/1994 | Gharavi . |

OTHER PUBLICATIONS

The Journal of the Institute of Television Engineers of Japan, vol. 44, No. 2, Feb. 1990. pp. 153–161.

*Primary Examiner*—Bentsu Ro
*Attorney, Agent, or Firm*—Fitzpatrick, Cella, Harper & Scinto

[57] ABSTRACT

Disclosed are an image coding method and apparatus for coding digital image data in a highly efficient manner, and to an image decoding method and apparatus for decoding the data thus coded. Each image signal constituting the image data is partitioned into a plurality of pixel blocks, and coding of each of the image signals is performed in block units. A plurality of items of coded data obtained by such coding are gathered together to form a block (a re-sync block) corresponding to each image signal. A plurality of the re-sync blocks corresponding to the image signals of an image area of the original image data are sequentially combined, boundary-line information is inserted between mutually adjacent re-sync blocks, and an error correction code is attached to form a code for transmission. In the apparatus for receiving this code, the code is decoded into the original image data by partitioning the code into re-sync blocks and performing decoding and interpolation in re-sync block units.

27 Claims, 10 Drawing Sheets

LUMINANCE SIGNAL Y

| Y(0,0) | Y(0,1) | Y(0,2) | Y(0,3) |
| --- | --- | --- | --- |
| Y(1,0) | Y(1,1) | Y(1,2) | Y(1,3) |
| Y(2,0) | Y(2,1) | Y(2,2) | Y(2,3) |
| Y(3,0) | Y(3,1) | Y(3,2) | Y(3,3) |
| Y(4,0) | Y(4,1) | Y(4,2) | Y(4,3) |

. . . . . . . . . . .

| Y(135,0) | Y(135,1) | Y(135,2) | Y(135,3) |

FIG. 7A

COLOR-DIFFERENCE SIGNALS Pb, Pr

| Pb(0,0)/Pr(0,0) | Pb(1,0)/Pr(1,0) | Pb(2,0)/Pr(2,0) | ... | Pb(67,0)/Pr(67,0) |
|---|---|---|---|---|
| Pb(0,1)/Pr(0,1) | Pb(1,1)/Pr(1,1) | Pb(2,1)/Pr(2,1) | ... | Pb(67,1)/Pr(67,1) |

FIG. 8B

# IMAGE CODING/DECODING METHOD AND APPARATUS

This application is a continuation of application Ser. No. 07/872,304, filed Apr. 23, 1992, now abandoned.

BACKGROUND OF THE INVENTION

1. Field of the Invention

This invention relates to an image coding method and apparatus for coding digital image data in a highly efficient manner, and to an image decoding method and apparatus for decoding the data thus coded.

2. Description of the Related Art

Variable-length coding and fixed-length coding can be used to code image data. In variable-length coding, it is known that coding such as predictive coding can be used.

Though variable-length coding is outstanding in terms of compression efficiency, once the compressed data develops an error on a transmission line, subsequent decoding of the compressed data is entirely impossible. As a result, when an error occurs in compressed data that is to be transmitted, the image develops a disturbance from this point onward and becomes extremely unattractive.

SUMMARY OF THE INVENTION

Accordingly, an object of the present invention is to provide an image coding method and apparatus so adapted that disturbance of an image due to an error in image data can be mitigated when image data is decoded and reproduced.

Another object of the present invention is to provide an image coding method and apparatus, as well as an image decoding method and apparatus, so adapted that even if an error occurs on a transmission line and the error cannot be corrected on the receiving side, the effects on image data can be confined within a predetermined group of coded data.

A further object of the present invention is to provide an image coding method and apparatus so adapted that a deterioration in image data can be held to a minimum by gathering and transmitting a group of coded data which corresponds to a predetermined area of the image data.

Yet another object of the present invention is to provide an image decoding method and apparatus so adapted that even if a transmission error in a group of coded data corresponding to a predetermined area of image data that has been gathered together and sent cannot be corrected, a deterioration in the image data can be held to a minimum by performing interpolation processing in the predetermined area.

According to the present invention, the foregoing objects are attained by providing an image coding apparatus for variable-length coding image data inputted thereto, comprising partitioning means for partitioning each of a plurality of types of image signals constituting image data into a plurality of blocks, coding means for coding, at variable lengths, each of the blocks resulting from partitioning by the partitioning means, code-group forming means for gathering coded data, which has been variable-length coded by the coding means, into units each of which consists of a predetermined number of items of data, and forming a plurality of types of code groups corresponding to the plurality of types of image signals, and output means for combining and outputting the code groups in conformity with an area of the image data.

According to the present invention, the foregoing objects are attained by providing an image coding method for variable-length coding inputted image data, comprising the steps of partitioning each of a plurality of types of image signals constituting image data into a plurality of blocks, coding, at variable lengths, each of the blocks resulting from partitioning at the partitioning step, gathering coded data, which has been variable-length coded, into units each of which consists of a predetermined number of items of data, and forming a plurality of types of code groups corresponding to the plurality of types of image signals, and combining and outputting the code groups in conformity with an area of the image data.

According to the present invention, the foregoing objects are attained by providing an image decoding apparatus for decoding, into original image data, inputted coded data which includes a plurality of types of code groups that have been coded in conformity with a plurality of types of image signals constituting image data, the coded data including at least a plurality of code groups combined and outputted in conformity with an image area of the image data, and boundary information interposed between mutually adjacent ones of the code groups, the apparatus comprising decoding means for discriminating the type of image signal corresponding to each of the plurality of code groups, discriminating the code group based upon the boundary information, and decoding the image data for every code group, and means for rearranging the image data, which has been decoded by the decoding means, in an order possessed by the original image data.

According to the present invention, the foregoing objects are attained by providing an image decoding method for decoding, into original image data, inputted coded data which includes a plurality of types of code groups that have been coded in conformity with a plurality of types of image signals constituting image data, the coded data including at least a plurality of code groups combined and outputted in conformity with an image area of the image data, and boundary information interposed between adjacent ones of the code groups, the method comprising the steps of discriminating the type of image signal corresponding to each of the plurality of code groups, discriminating the code group based upon the boundary information, and decoding the image data for every code group, and for rearranging the decoded image data in an order possessed by the original image data.

According to the present invention, the foregoing objects are attained by providing an image transmitting apparatus for transmitting luminance data and chrominance data, comprising means for dividing said luminance image data and chrominance image data into a plurality of vertical divided blocks, a size of said block for luminance image data is different from that of said block for chrominance image data; and means for transmitting divided luminance image data and chrominance image data, into units each consists of a block belong to vertical divided area.

Other features and advantages of the present invention will be apparent from the following description taken in conjunction with the accompanying drawings, in which like reference characters designate the same or similar parts throughout the figures thereof.

BRIEF DESCRIPTION OF THE DRAWINGS

FIGS. 4A and 4B are block diagrams showing the construction of an image coding/decoding apparatus according to an embodiment of the invention, in which FIG. 4A illustrates the coding section and FIG. 4B the decoding section;

FIGS. 5A and 5B are diagrams showing the constitution of image data coded in this embodiment, in which FIG. 5A illustrates the constitution of luminance-signal data and FIG. 5B the constitution of color-difference signal data;

DESCRIPTION OF THE PREFERRED EMBODIMENT

A preferred embodiment of the present invention will now be described in detail with reference to the accompanying drawings.

Figure 1:
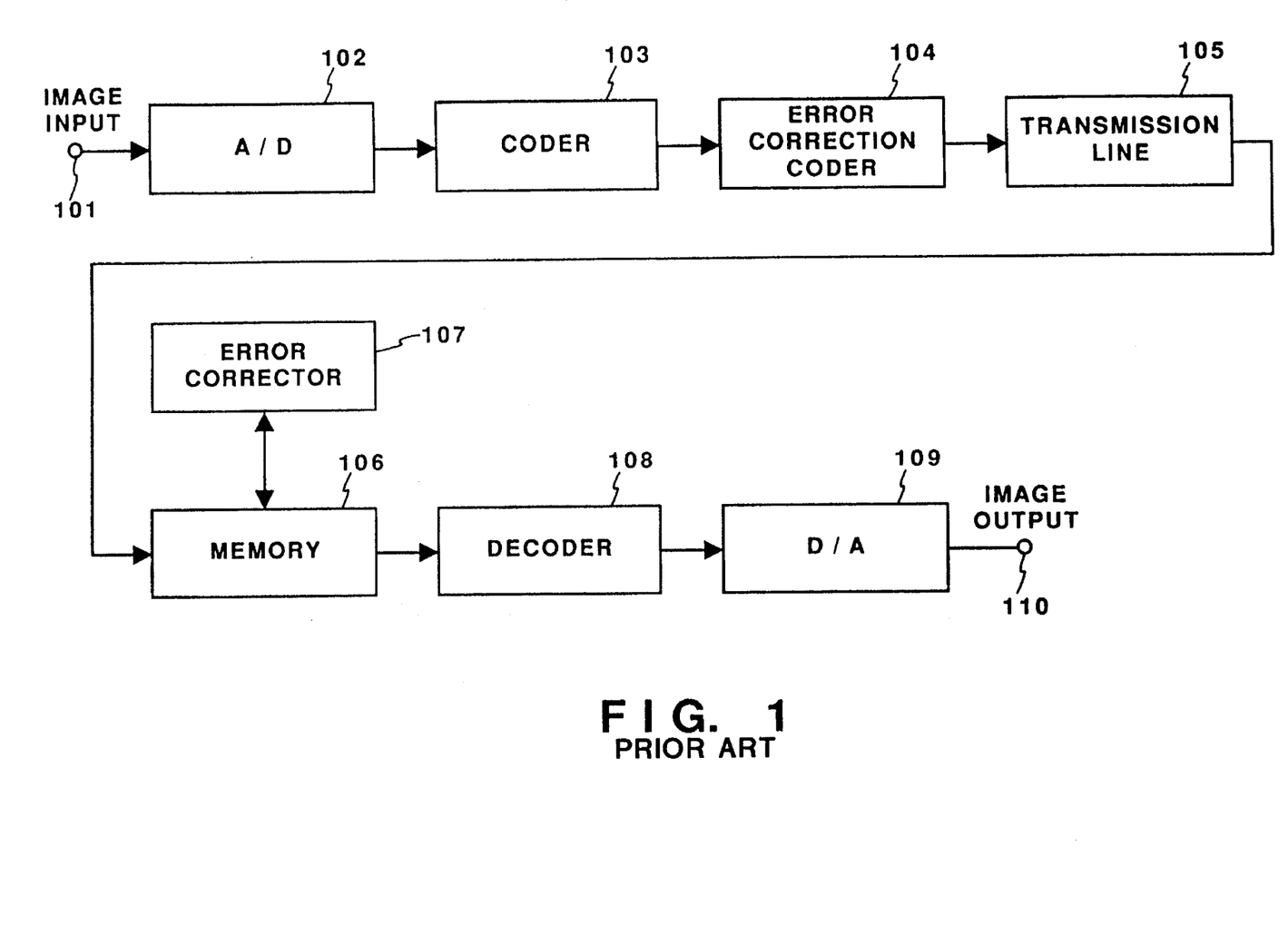
FIG. 1 is a block diagram illustrating the construction of a common image coding apparatus.

FIG. 1 is a block diagram showing the construction of a common image coding apparatus.

In FIG. 1, image data inputted from an image input terminal 101 is converted from an analog signal to a digital signal by an A/D converter 102. The digital data resulting from the conversion is applied to a coder 103, which subjects the digital signal to compression coding at variable lengths. The resulting code is applied to an error correction coder 104, which attaches a parity code for the purpose of subsequent error correction. The resulting data is sent to a transmission line 105. The data received from the transmission line 105 is temporarily accumulated in a memory 106 so that errors may be corrected by an error correcting unit 107. A decoder 108 expands and decodes the compressed variable-length data read out of the memory 106. The signal resulting from decoding is applied to a D/A converter 109, which converts the digital signal to an analog signal and outputs the analog signal as an image signal.

Various methods of compressing color image data in the coder 103 of FIG. 1 have been proposed. A typical example of color-image coding is a method based upon ADCT (adaptive discrete cosine transform). ADCT methods have been described in detail in a paper entitled "Coding of Still Pictures" by Takahiro Saito, et. al., in *The Journal of the Institute of Television Engineers of Japan* [Vol. 44, No. 2, (1990)], and in a paper entitled "Trends in International Standards of Still-Picture Coding" by Hiroshi Koshiji, et. al., in *The Preliminary Draft in National Conference of the Institute of Image Electronics of Japan* (1988).

Figure 2:
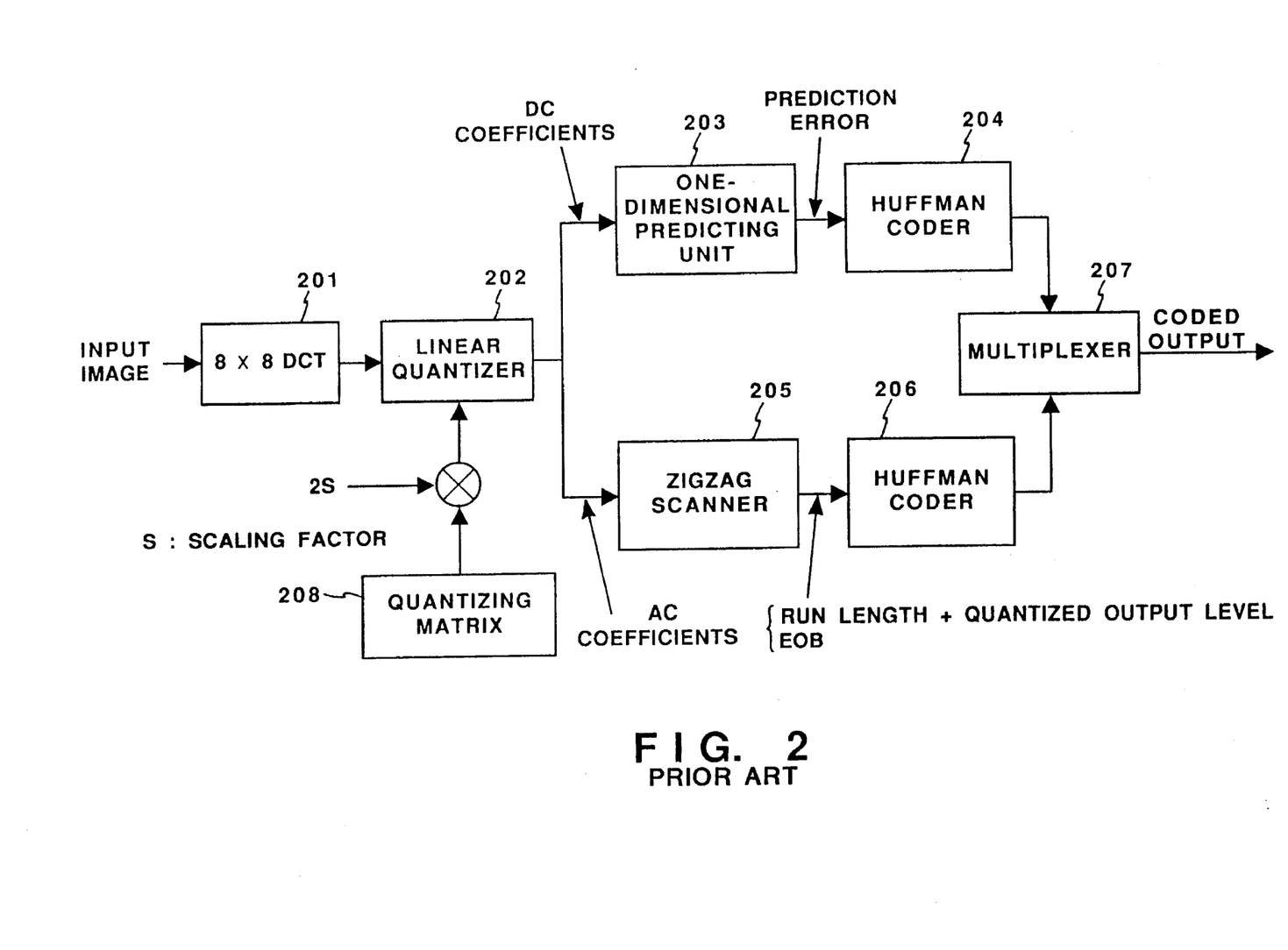
FIG. 2 is a diagram for describing variable-length coding.

FIG. 2 is a block diagram illustrating the construction of the coder 103 in a case where the coder employs the ADCT method. In FIG. 2, an input image is assumed to be multi-valued color image data, outputted by the A/D converter 102 of FIG. 1, that is the result of converting the analog image into eight bits, i.e., 256 tones/color. With regard to the number of colors, the image data represents three of four colors, such as RGB, YUV, YPbPr, YMCK, etc. This input image is applied to a converter 201, which subjects the image to a two-dimensional discrete cosine transform (hereinafter the discrete cosine transform shall be abbreviated to "DCT") in sub-block units of 8×8 pixels. The resulting data is then applied to a linear quantizer 202, where linear quantization of transformation coefficients is carried out. At the time of quantization, the step size of quantization differs for every transformation coefficient. Quantization step size for each transformation coefficient is taken to be a value that is 2S times 8×8 quantization matrix elements that take into consideration differences in spectral luminous efficacy, from one transformation coefficient to another, with respect to quantization noise. Here S is a positive or negative integer and is referred to as a scaling factor. Picture quality and the amount of data generated are controlled by the value of S. Table 1 below illustrates an example of quantization matrix elements.

TABLE 1

| 16 | 11 | 10 | 16 | 24  | 40  | 51  | 61  |
|----|----|----|----|-----|-----|-----|-----|
| 12 | 12 | 14 | 19 | 26  | 58  | 60  | 55  |
| 14 | 13 | 16 | 24 | 40  | 57  | 69  | 56  |
| 14 | 17 | 22 | 29 | 51  | 87  | 80  | 62  |
| 18 | 22 | 37 | 56 | 68  | 109 | 103 | 77  |
| 24 | 35 | 55 | 64 | 81  | 104 | 113 | 92  |
| 49 | 64 | 78 | 87 | 103 | 121 | 120 | 101 |
| 72 | 92 | 95 | 98 | 112 | 100 | 103 | 99  |

Following quantization by the linear quantizer 202, direct-current conversion components (hereinafter referred to as "DC components") of the quantized output are applied to a one-dimensional predicting unit 203, which perform a one-dimensional prediction between adjacent sub-blocks. The resulting prediction error is subjected to Huffman coding in a Huffman coder 204. Here the quantized output of the prediction error is split into groups, the identification number of the group to which the prediction error belongs is Huffman-coded, and then which value this is in the group is represented by a code of the same length.

Figure 3:
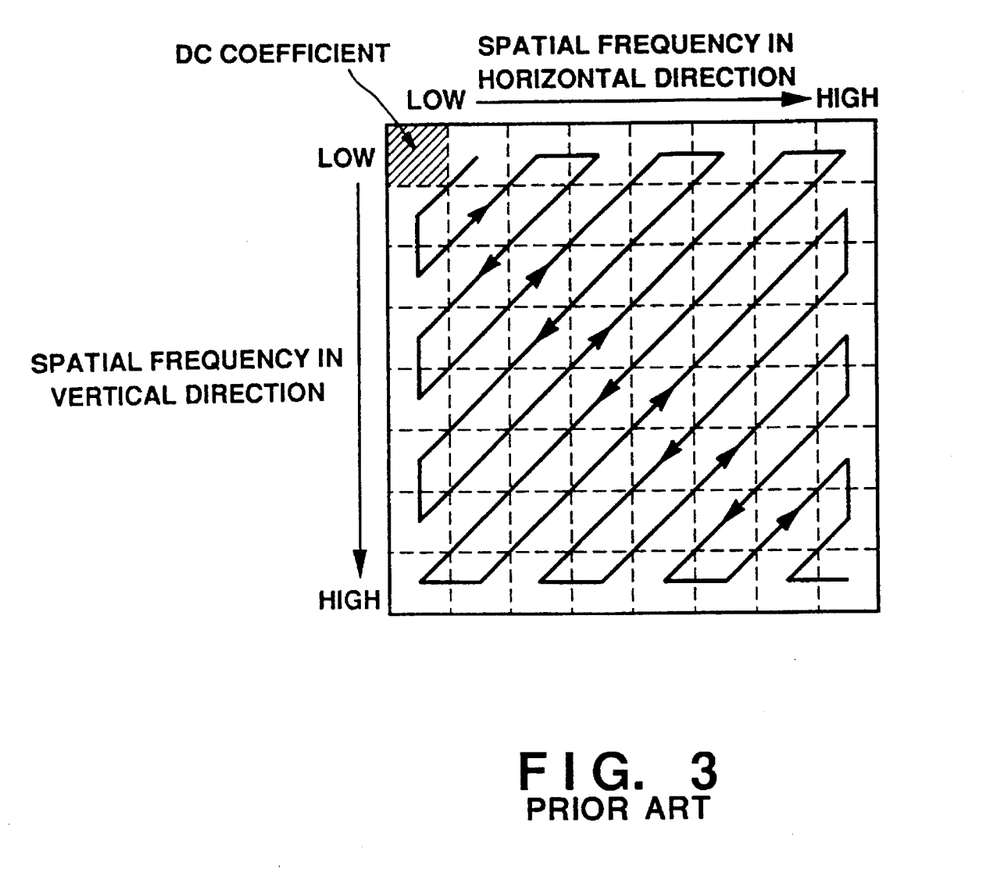
FIG. 3 is a diagram for describing zigzag scanning in the variable-length coding method of FIG. 1.

Meanwhile, alternating-current conversion components (hereinafter referred to as "AC components") of the quantized output are applied to a zigzag scanner 205, which performs coding while scanning is carried out from low-frequency components to high-frequency components, as illustrated in FIG. 3. Specifically, transformation coefficients for which the quantized output is not "0" (these are referred to as "significant coefficients") are classified into groups according to their values. In the Huffman coder 206, the group identification number and the number of transformation coefficients for which the quantized output is "0" (these are referred to as "invalid coefficients") between a significant coefficient and the immediately preceding significant coefficient are Huffman-coded as one set. Then, which value this is in the group is represented by a code of the same length.

Figure 4A:
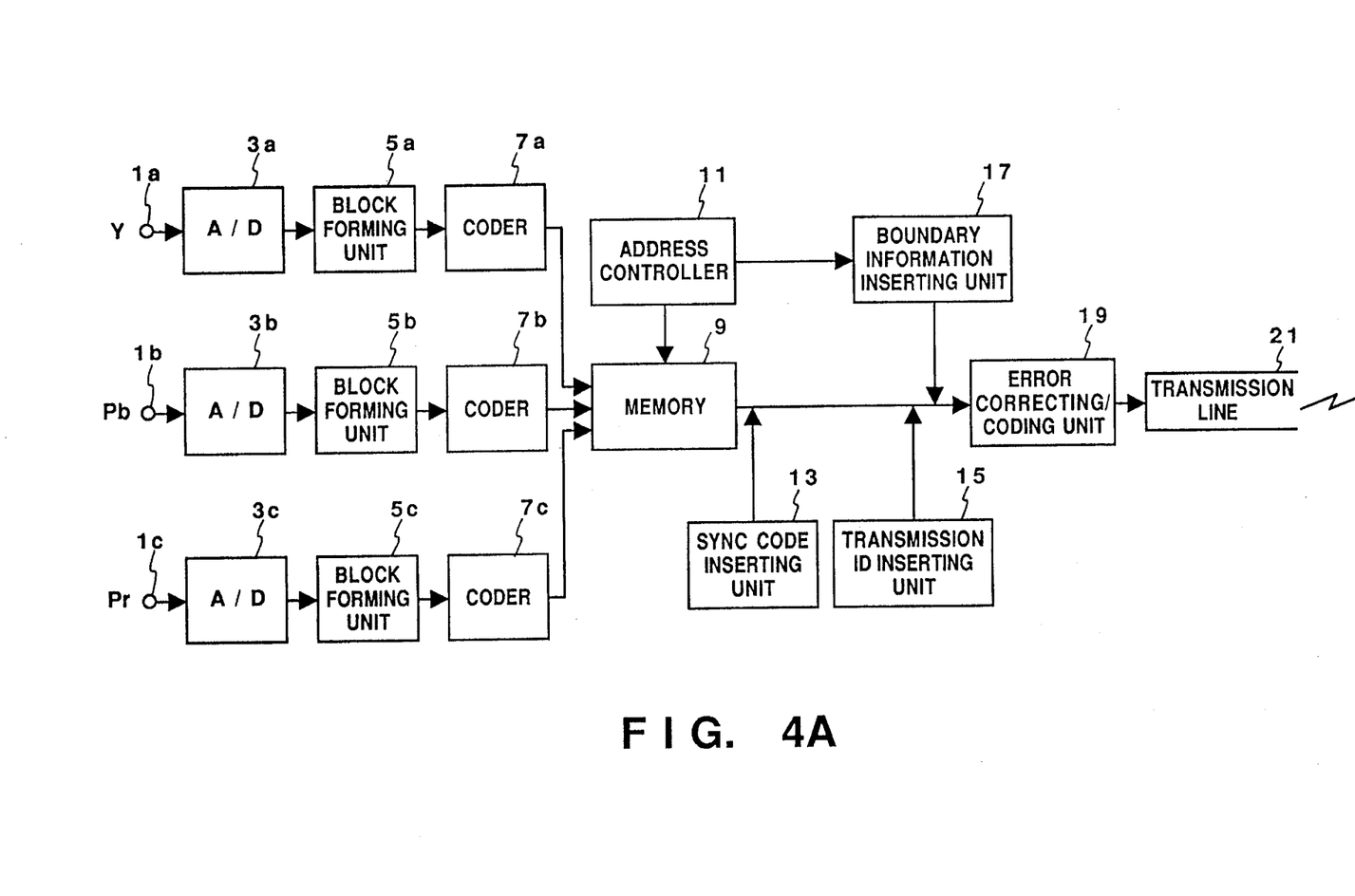
Figure 4B:
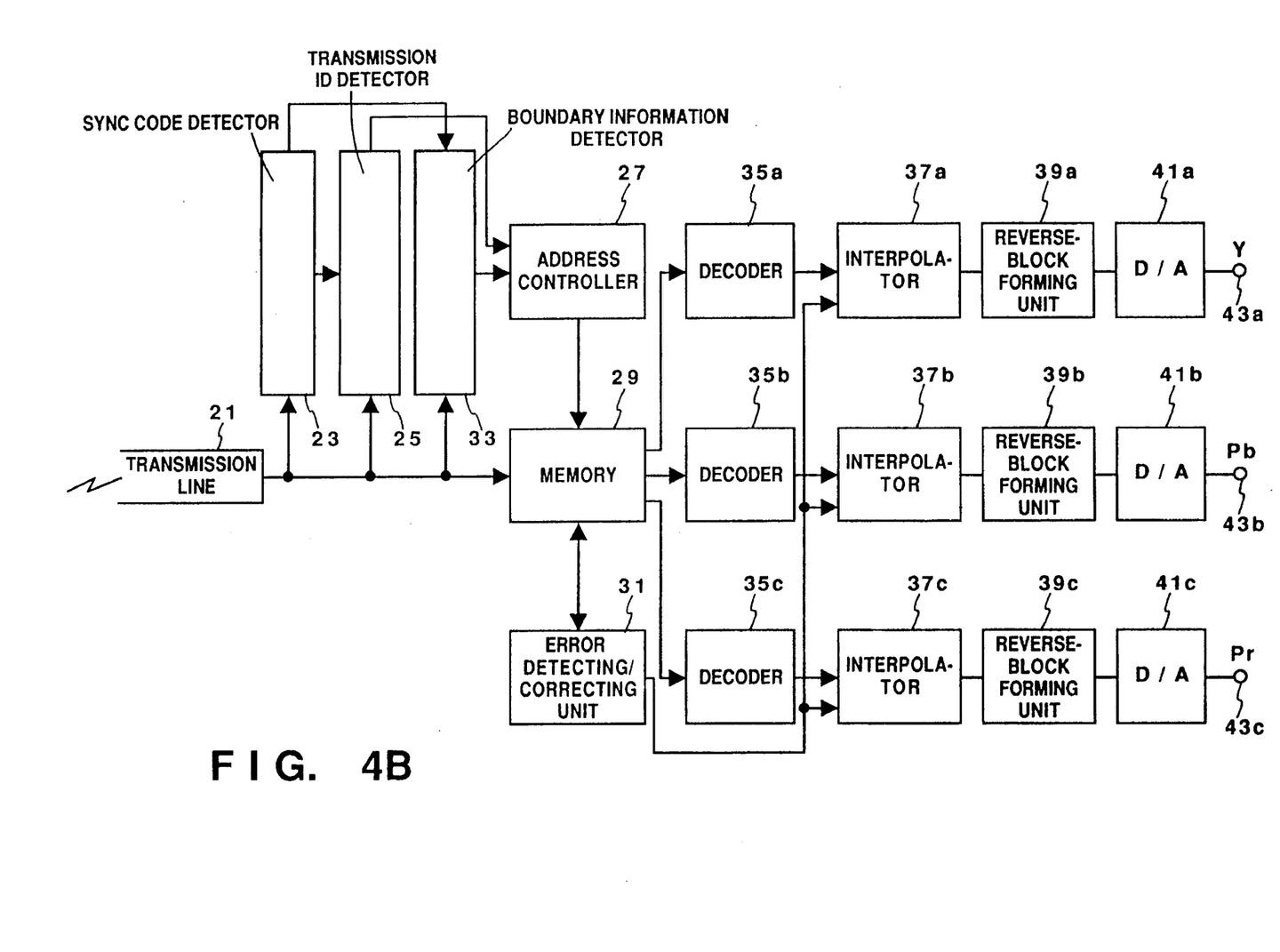

FIGS. 4A and 4B are block diagrams showing the construction of an image coding/decoding apparatus according to this embodiment.

In FIG. 4A, image signals Y, Pb, Pr comprising plurality types of signals are inputted from terminals 1a, 1b, 1c, respectively. It is assumed here that a luminance signal Y and color-difference signals Pb, Pr are the three signals of the inputted color image signals. The input signals Y, Pb, Pr are applied to A/D converters 3a, 3b, 3c, respectively, where they are converted into digital signals. In this embodiment, the luminance signal Y is sampled at a sampling rate which is twice that of the color-difference signals Pb, Pr, and the color-difference signals are line-sequenced by a line sequencing circuit, which is not shown. As a result, if the quantity of data in each of these signals after the A/D conversion is compared, the ratio will be 4:1:1 for the luminance signal Y and color-difference signals Pb, Pr, respectively.

Next, the digitized items of data are applied to block-forming circuits 5a, 5b, 5c, respectively, where the data is formed into blocks of, say, 8×8 pixels each. Since the quantities of these items of data are in the ratio of 4:1:1, as mentioned above, the size of each produced block on a screen will be such that the color-difference signals Pb, Pr each will have a size that is four times that of the luminance signal Y. Further, each item of data thus formed into a block is subjected to variable-length compression coding in respective coders 7a, 7b, 7c by variable-length compression coding of the kind described above with reference to FIGS. 1 and 2. In this embodiment, however, the arrangement is such that each item of image data is partitioned into a plurality of areas for each and every signal, and closed variable-length coding is carried out in each area. As an example of these areas, an area comprising a quantity of data obtained by gathering, say, 40 of the blocks of 8×8 pixels is adopted.

A group of generated codes obtained by compression coding for every signal and every area as set forth above is written in a memory 9, and the data is consolidated into a single data series when it is read out of the memory. The order in which the data is read out of the memory 9 is controlled by the address controller 11. In this embodiment, the groups of produced codes obtained by performing coding for each of the plurality of signals, namely for each the luminance signal Y and color-difference signals Pb, Pr, are collected and outputted in time-series fashion for each area which belongs to the same position on the screen or for each area which belongs to a neighboring position. The order of readout will be described in greater detail later with reference to FIGS. 8A and 8B.

The data series read out of the memory 9 is acted upon by a sync-code inserting unit 13, which inserts a sync code into the data at a predetermined position thereof, and by a transmission-ID inserting unit 15, which inserts a transmission ID. Further, information indicating partitioning of the generated codes for the areas subdivided as described above is inserted into the data series in the form of, say, a marker code, by means of a boundary-information inserting unit 17. On the basis of this information, the boundaries between generated codes can be detected on the receiving side so that decoding of variable-length codes is capable of being carried out reliably for each of the subdivided areas.

The generated codes that have been compression-coded are subjected to error-correction coding in an error detecting/correcting coding circuit 19. Here a parity bit for error detection and correction coding is inserted into the data series at a predetermined position thereof, after which the data is transmitted on a transmission line 21.

In case of immediate transmission, the transmission line 21 is a transmission medium of the ground radio wave type or optical beam type, such as medium which relies upon an optical fiber, a satellite or microwaves. In case of stored transmission, the transmission line is a memory medium such as a tape medium, examples of which are a digital VTR and a DAT, a disk-like medium such as a floppy disk or optical disk, or a solid-state medium such as a semiconductor memory. The transmission rate is decided by the amount of information in the original image, the compression ratio and the required transmission time. The transmission rate can range from tens of kilobytes per second to tens of megabytes per second.

Operation on the receiving side will be described with reference to FIG. 4B.

The data received from the transmission line 21 is synchronously detected in a sync-code detector 23, the output of which is applied to a transmission-ID detector 25. Here the attribute of the data is detected based upon its transmission ID. Under the control of an address controller 27 which operates based upon this information, the received data is temporarily stored in a memory 29. The data in memory 29 is subjected to error detection and correction in an error detecting/correcting unit 31, whereby error picked up by the data during transmission is eliminated to the maximum possible extent. If there is an error that cannot be completely corrected, a flag is raised for this group of data and interpolation processing is executed in interpolating circuits 37a, 37b and 37c.

The boundary of the compressed code of a subdivided area is detected by a boundary-information detector 33. On the basis of this information, the address for reading data out of the memory 29 is controlled by the address controller 27 so that the data is read out upon being partitioned for each of the plurality of signals, namely for each of the luminance and color-difference signals Y, Pb, Pr according to this embodiment, and for each of the subdivided areas. The data thus partitioned and read out of the memory 29 is expanded and decoded in decoders 35a, 35b, 35c. Then, in the interpolating circuits 37a, 37b and 37c, interpolation processing is applied, in the units of the subdivided areas, to the data groups which contain errors that could not be completely corrected. One specific example of interpolation processing is interpolation which uses the data in the previous frame. Following interpolation processing, the data is restored to the order of the original signal transmission for each of the luminance and color-difference signals in reverse-block forming circuits 39a, 39b, 39c. With regard to the color-difference signals Pb, Pr, the line-sequenced data is restored by synchronizing circuitry, not shown.

The signals are converted into analog data by respective ones of D/A converting circuits 41a, 41b, 41c and are outputted from terminals 43a, 43b, 43c as the luminance signal Y and color-difference signals Pb, Pr, respectively. In the prior art, coded areas are not divided. Consequently, in the expansion and decoding of the variable-length codes in the decoders 35a, 35b, 35c, subsequent decoding processing can no longer be performed once an error occurs. In the present embodiment, however, the areas of the image data are partitioned at the time of coding, and the data is transmitted upon attaching the boundary information indicative of the subdivisions, as described above.

As a result, recovery from decoding processing can be carried out rapidly.

This embodiment of the invention will be described in further detail with reference to FIGS. 5A, 5B, FIG. 6, FIGS. 7A, 7B and FIGS. 8A, 8B.

Figure 5A:
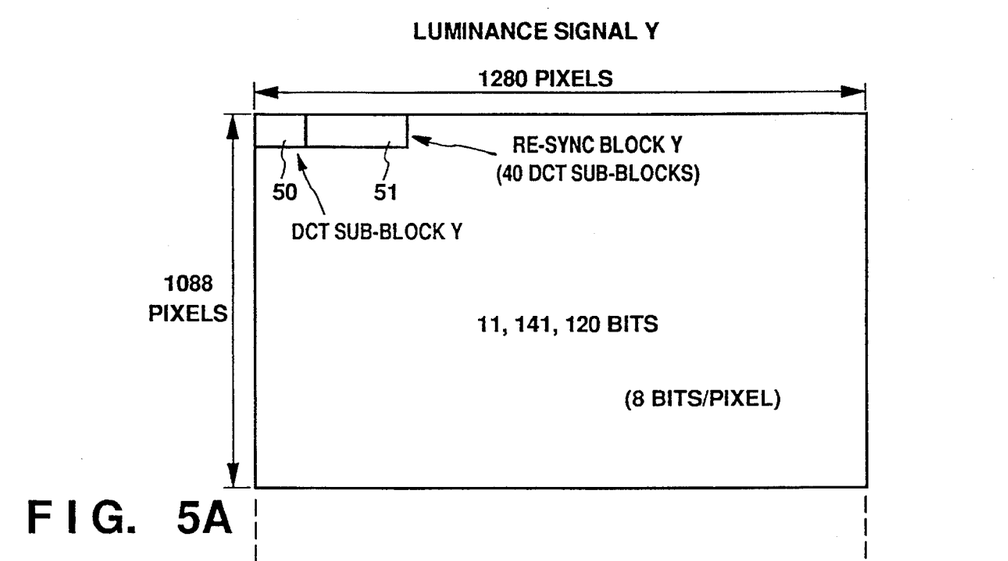
Figure 5B:
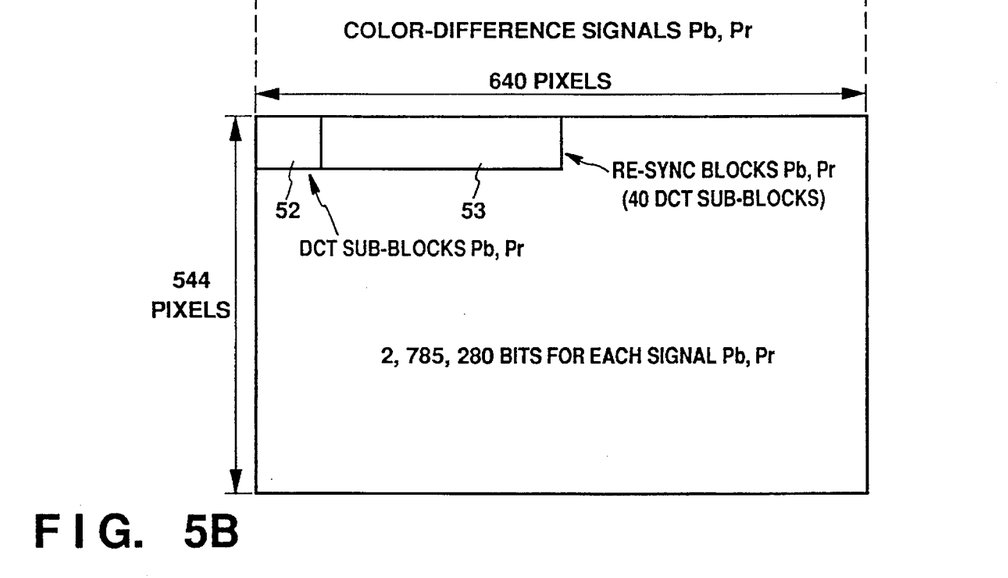

FIGS. 5A, 5B are diagrams showing an example of image data to be transmitted. In FIG. 5A, the luminance signal Y of a single image is composed of 1280 pixels in the horizontal direction and 1088 pixels in the vertical direction, and each pixel is A/D-converted into eight bits. The quantity of data per one frame of the luminance signal Y in this case is 1,280×1,088×8 (bits)=11,141,120 bits.

On the other hand, the color-difference signals Pb, Pr are each sampled at a sampling rate one-half that of the luminance signal Y, as mentioned earlier, and the signals are subjected to color-difference line sequencing. As a result, the quantity of data per one frame of each of these signals is 640×544×8 (bits)=2,785,280 bits, as shown in FIG. 5B.

Accordingly, a single image is composed of the total amount of data of the luminance signal Y and color-difference signals Pb, Pr, namely 16,711,680 (=11,141,120+2, 785,280×2) bits.

The eight horizontal pixels by eight vertical pixels (8×8) are treated as a DCT sub-block and, as shown in FIGS. 5A and 5B, 40 DCT sub-blocks in each of the signals of one image to be transmitted are partitioned as one re-sync block of 320 horizontal pixels by 8 vertical pixels (320×8). In FIG. 5A, numeral 50 denotes a DCT sub-block of the luminance signal Y, and numeral 51 denotes a re-sync block of the luminance signal Y that includes 40 of the DCT sub-blocks 50. In FIG. 5B, numeral 52 represents a DCT re-sync block of the color-difference signals Pb, Pr, and numeral 53 represents a re-sync block that includes 40 of the DCT sub-blocks 52. These re-sync blocks are treated as the partitioned areas of the present embodiment, and closed variable-length coding is performed within these partitioned areas. It should be noted that the partitioned areas are not limited to those of this embodiment and may be obtained by other partitioning methods.

With regard to the luminance signal Y shown in FIG. 5A, one frame of data is partitioned into a total of 544 areas, namely 4 horizontal areas (=1280/320) by 136 vertical areas (=1088/8), by the re-sync blocks 51. With regard to the color-difference signals Pb, Pr of FIG. 5B, one frame of data of each is partitioned into a total of 136 re-sync blocks 53, namely a total of 2 horizontal re-sync blocks by 68 vertical re-sync blocks. The data capacity per re-sync block is 40×8×8×8=20,480 bits for each signal. As for the sizes of one re-sync block in one frame for these signals, the ratio is (luminance-signal re-sync block 51):(color-difference signal re-sync block 53)=1:4.

Figure 6:
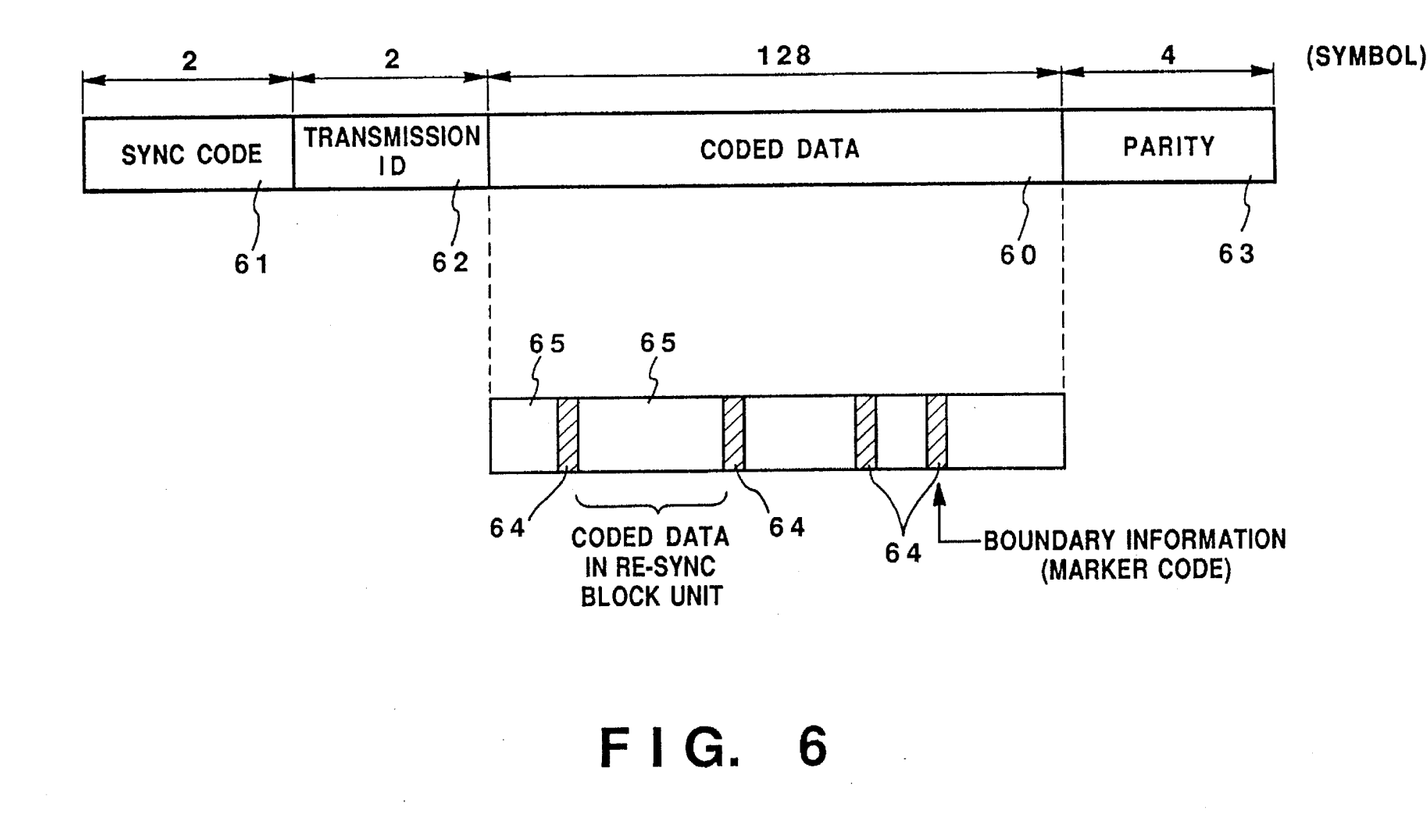
FIG. 6 is a diagram showing an example of the format of coded data transmitted by the coding section according to this embodiment.

FIG. 6 is a diagram showing an example of the transmission format according to this embodiment.

Boundary information (marker code) 64 according to this embodiment is inserted in coded data 60, which results from the coding performed as described earlier, in such a manner that this data can be distinguished in re-sync block units. FIG. 6 illustrates an example in which the marker codes 64 are inserted at the boundaries of coded data 65 of the re-sync units. It is required that a bit pattern which will not occur in the coded data 65 be assigned as the marker codes 64.

The coded data 60 in which the boundary information has thus been inserted is subjected to error detection and correction coding. It is assumed here that a parity bit 63 of four symbols is appended to data composed of 128 symbols (it is assumed hereinafter that one symbol is equal to eight bits). The result of appending a sync code 61 of two symbols and a transmission ID 62 of two symbols to this data serves as a transmission unit.

Since the coded data 65 in re-sync units has been variable-length coded, the length of the coded data series for every re-sync block is not fixed but differs from one from one block to another. Consequently, there may be occasions where the data in one re-sync block extends over a plurality of error detection/correction blocks. Conversely, there may also be cases where one block of an error detection/correction code is composed of the data of several re-sync blocks, and the number thereof also is not fixed. In a case where one block of an error detection/correction code is composed of a plurality of re-sync blocks and it is impossible to correct an error in this error detection/correction block, the effects will extend over a plurality of re-sync blocks. These re-sync blocks are subjected to interpolation processing of the kind described earlier.

Thus, even if an error incapable of being corrected occurs, in this embodiment the order of transmission of the coded data also is stipulated in such a manner that the effects of this error are reduced.

Figure 7A:
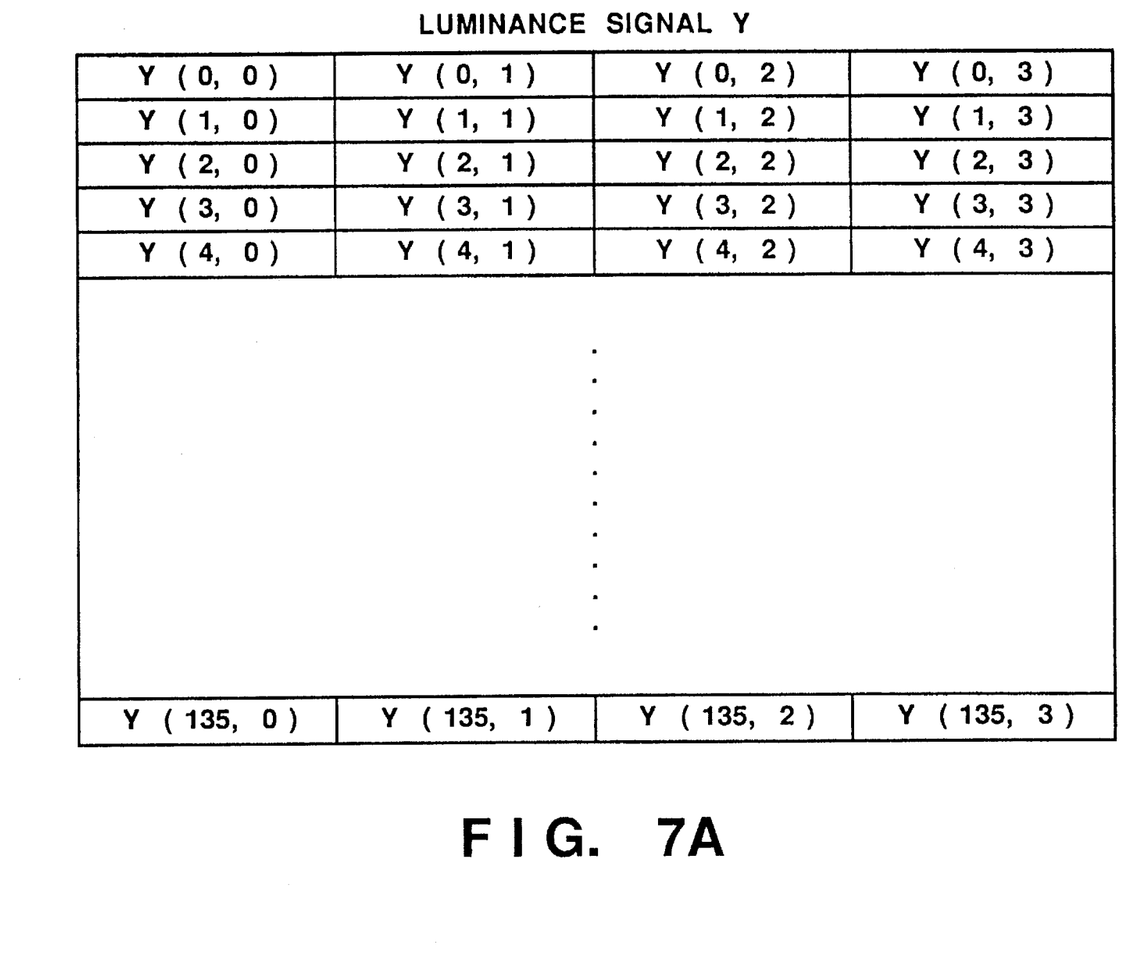
FIGS. 7A and 7B are diagrams showing an example of the numbering of re-sync blocks of a luminance signal and color-difference signals in this embodiment.
Figure 7B:
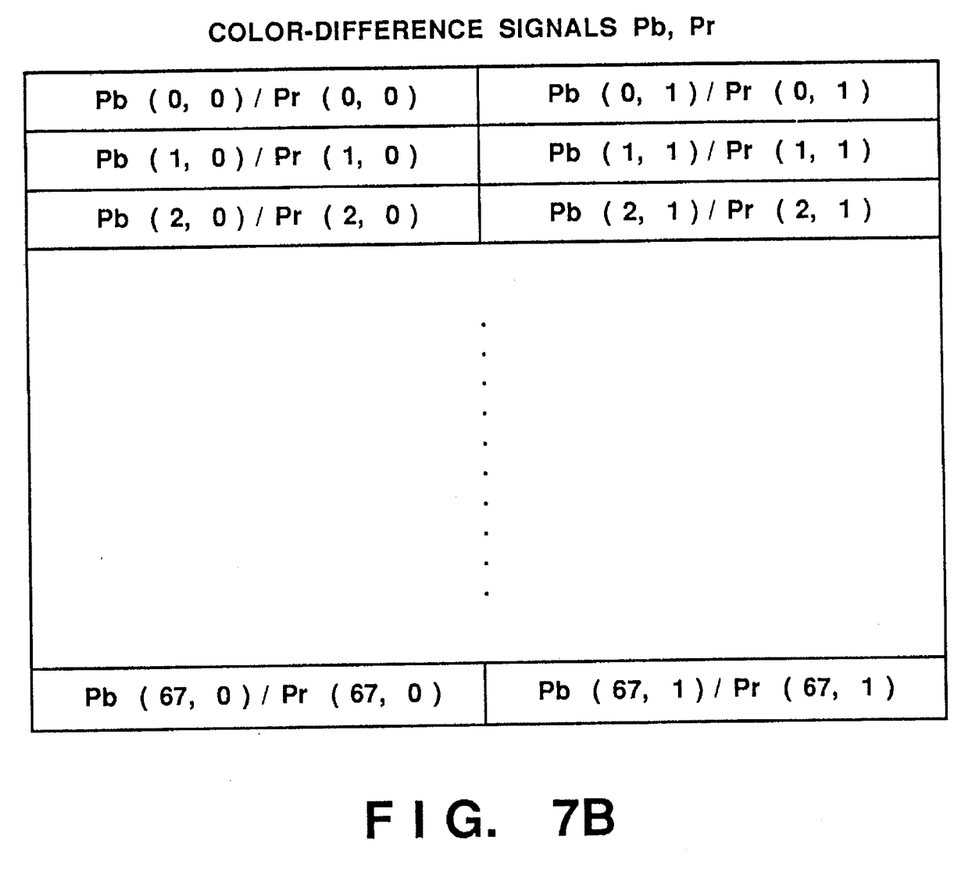

It will be assumed here that numbering of the re-sync blocks has been carried out for each of the luminance and color-difference signals Y, Pb, Pr, as shown in FIGS. 7A and 7B. In consideration of the quantity of data for each signal, one re-sync block of each of the color-difference signals Pb, Pr should be transmitted as opposed to four re-sync blocks of the luminance signal Y. Consequently, assume, by way of example, that transmission has been performed as follows:

Y(0,0), Y(0,1), Pb(0,0), Y(0,2), Y(0,3), Pr(0,0), Y(1,0), Y(1,3), Pb(0,1), Y(1,2), Y(1,3), Pr(0,1), ... If Y(0,2), Y(0,3), Pr(0,0) are contained in the same error detection/correction block and error correction is not possible in this error detection/correction block, then the undesirable result will be that the interpolated areas will be scattered about within the frame.

Figure 8A:
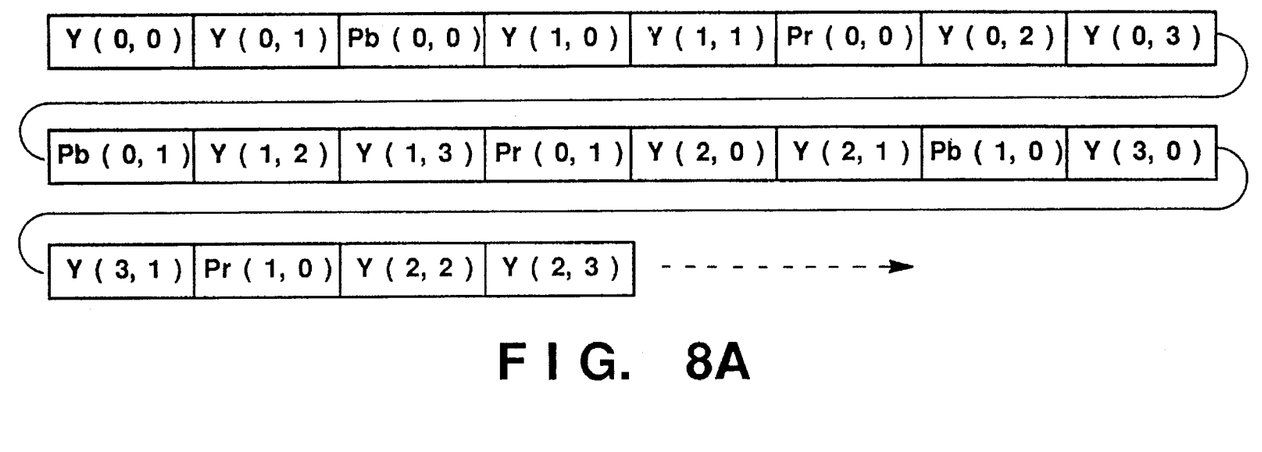
FIGS. 8A and 8B are diagrams each showing a transmission sequence of re-sync blocks according to this embodiment.
Figure 8B:
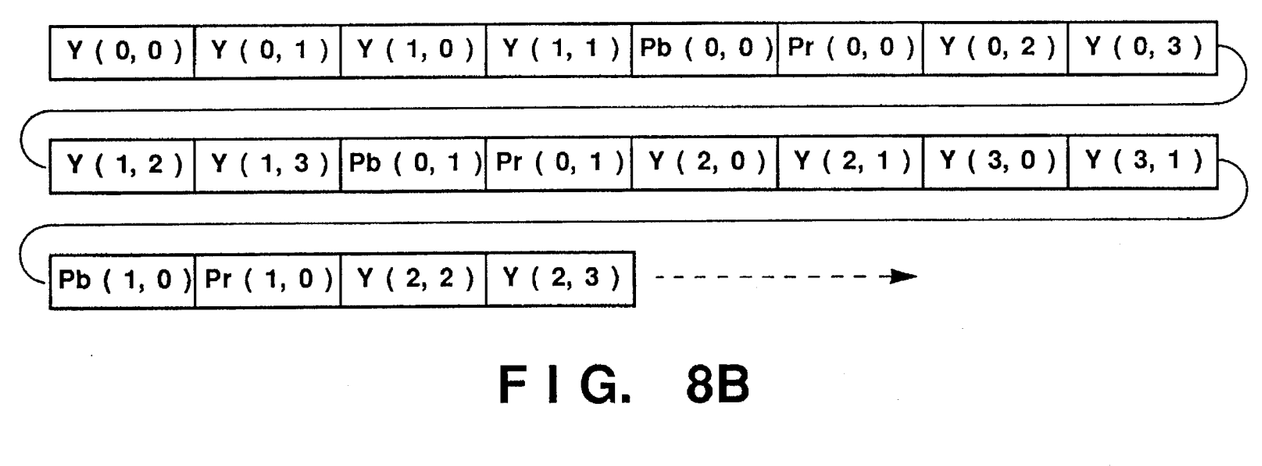

Accordingly, in this embodiment, the address controller 11 is controlled in such a manner that re-sync blocks at the same position or at adjacent positions in the frame will be transmitted together, as in the manner Y(0,0), Y(0,1), Pb(0, 0), Y(1,0), Y(1,1), Pr(0,0), Y(0,2), Y(0,3), Pb(0,1), Y(1,2), Y(1,3), Pr (0,1) , . . . , as illustrated in FIG. 8A, or Y(0,0), Y(0,1), Y(1,0), Y(1,1), Pb(0,0), Pr(0,0), Y(0,2), Y(0,3), Y(1,2), Y(1,3), Pb(0,1), Pr(0,1), . . . , as illustrated in FIG. 8B, by way of example.

As a result, even if a correction cannot be performed in a particular error detection/correction block, the probability that interpolated areas will be dispersed across the frame, as set forth above, is diminished.

The plurality of types of signal constituting the image data are not limited to the luminance signal Y and color-difference signals Pb, Pr in this embodiment. For example, the signals may be RGB, YUV, YMCK signals, etc. Furthermore, the method of forming the areas which partition the image data also is not limited to the partitioning method of this embodiment.

The present invention may be applied to a system constituted by a plurality of apparatus or to a single apparatus. Further, it goes without saying that the invention is applicable also to a case where a program for implementing the invention is supplied to a system or apparatus.

Thus, in accordance with the embodiment described above, if an error which occurs on a transmission line is incapable of being completely corrected by an error detection/correction code, the effects of the error can be held to the minimum without sacrificing the excellent features of variable-length coding, which is outstanding in terms of compressing efficiency. More specifically, if an error develops in data on a transmission line and the error cannot be completely corrected on the receiving side, the effects thereof can be minimized every re-sync block.

Further, with regard to interpolation processing carried out when an error cannot be completely corrected, the re-sync blocks which undergo interpolation processing are not scattered positionally in the frame but are gathered together at the same positions or at adjacent positions so that a deterioration in the image data can be held to a minimum. As a result, the image coding apparatus of the invention makes it possible to reproduce an excellent image that is not unattractive to the human eye.

In accordance with the present invention, as described above, coding is performed by partitioning image data into a plurality of areas for each and every image signal. Therefore, when the coded data is decoded and reproduced, the image can be reproduced with minimum disturbance even if an error has developed in the coded image data.

As many apparently widely different embodiments of the present invention can be made without departing from the spirit and scope thereof, it is to be understood that the invention is not limited to the specific embodiments thereof except as defined in the appended claims.

What is claimed is:

1. An image coding apparatus for variable-length coding image data inputted thereto, comprising:

partitioning means for partitioning each of luminance signals and color-difference signals of image data into a plurality of blocks;

coding means for coding, at variable lengths, each of the blocks resulting from partitioning by said partitioning means;

code-group forming means for gathering coded data, which has been variable-length coded by said coding means, into units each of which consists of a predetermined number of items of data, and forming a plurality of types of code groups corresponding to the luminance signals and the color difference signals of the image data; and output means for combining and outputting the code groups in conformity with an area of the image data.

2. The image coding apparatus according to claim 1, wherein said coding means comprises a conversion circuit for performing an orthogonal transformation of each of the blocks, a quantizing circuit for quantizing each of the blocks that are orthogonally transformed by said conversion circuit and an encoding circuit for encoding each item of quantized data quantized by said quantizing circuit into encoded data.

3. The image coding apparatus according to claim 2, wherein said encoding circuit encodes each item of the quantized data by using Huffman encoding.

4. The image coding apparatus according to claim 2, wherein said quantizing circuit can change a quantization step size.

5. An image coding apparatus for variable-length coding image data inputted thereto, comprising:

partitioning means for partitioning each of types of image signals constituting image data into a plurality of blocks;

coding means for coding, at variable lengths, each of the blocks resulting from partitioning by said partitioning means;

code-group forming means for gathering coded data, which has been variable-length coded by said coding means, into units each of which consists of a predetermined number of items of data, and forming a plurality of types of code groups corresponding to the plurality of types of image signals; and output means for extracting, in a predetermined sequence, each type of code group of the image signals corresponding to a predetermined area of the image data, for packing boundary information between mutually adjacent code groups, and for outputting the code groups upon appending at least an error correction code.

6. The apparatus according to claim 5, wherein said coding means codes each of the plurality of types of image signals by a discrete cosine transform.

7. An image coding apparatus for variable-length coding a color image signal inputted thereto, comprising:

an A/D converter, to which are inputted a luminance signal and color-difference signals constituting the color image signal, for converting each of these signals into a digital signal, partitioning means for partitioning each item of luminance data and color-difference data, which are the result of the conversed performed by said A/D converter, into a predetermined pixel-block unit;

a coding circuit for coding the data of each block partitioned by said partitioning means;

means for creating coded data groups by forming the items of coded data, which correspond to the luminance data and color-difference data coded by said coding circuit, into block units, each of which consists of a predetermined number of items of data, in the signal order of the color image signal; and output means for extracting the coded data groups corresponding to the luminance data and color-difference data, each in a predetermined sequence in conformity with an image area of the color image signal, packing boundary data between mutually adjacent coded data groups and outputting the code groups upon appending at least an error correction code.

8. The apparatus according to claim 7, wherein the luminance signal and color-difference signals are sampled at mutually different sampling rates, and said output means decides the number of coded data groups corresponding to the color-difference data with respect to the number of coded data groups corresponding to the luminance data of an image area of the color image signal.

9. A coding apparatus, comprising:

input means for inputting luminance data and color-difference data constituting image data representing an image;

encoding means for variable-length encoding each of said luminance data and color-difference data independently; and output means for outputting encoded data and an error correction code as one unit, said encoded data including predetermined items of said luminance data and said color-difference data, wherein said luminance data and said color-difference data included in said one unit are obtained from substantially the same area on said image.

10. The coding apparatus according to claim 9, wherein a number of items of said luminance data is larger than a number of items of said color-difference data.

11. The coding apparatus according to claim 9, wherein said encoding means encodes each of said luminance data and said color-difference data in a time division fashion at a predetermined rate.

12. The coding apparatus according to claim 9, wherein said encoding means encodes each of said luminance data and said color-difference data in a predetermined number of block units.

13. The coding apparatus according to claim 12, wherein said encoding means comprises a conversion circuit for performing an orthogonal transformation of each of the blocks, a quantizing circuit for quantizing each of the blocks that are orthogonally transformed by said conversion circuit and an encoding circuit for encoding each item of quantized data quantized by said quantizing circuit into encoded data.

14. The image coding apparatus according to claim 13, wherein said encoding circuit encodes each item of the quantized data by using Huffman encoding.

15. The image coding apparatus according to claim 14, wherein said quantizing circuit can change a quantization step size.

16. A coding apparatus, comprising:

input means for inputting luminance data and color-difference data constituting image data representing an image;

encoding means for variable-length encoding each of said luminance data and color-difference data independently;

memory means for storing luminance encoded data corresponding to said luminance data and color-difference encoded data corresponding to said color-difference data;

memory control means for reading out said luminance and color-difference encoded data from said memory means as one unit, said luminance encoded data and color-difference encoded data being obtained from substantially the same area of said image; and addition means for adding error correction code to each unit read out by said memory control means.

17. The coding apparatus according to claim 16, wherein a number of items of said luminance data is larger than a number of items of said color-difference data.

18. The coding apparatus according to claim 16, wherein said encoding means encodes each of said luminance data and said color-difference data in a time division fashion at a predetermined rate.

19. The coding apparatus according to claim 16, wherein said encoding means encodes each of said luminance data and said color-difference data in a predetermined number of block units.

20. The coding apparatus according to 16, wherein said addition means adds the error correction code synchronously with an operation of said memory control means.

21. An image coding method for variable-length coding inputted image data, comprising the steps of:

partitioning each of a plurality of luminance signals and color-difference signals of image data into a plurality of blocks;

coding, at variable lengths, each of the blocks resulting from partitioning at the partitioning step;

gathering coded data, which has been variable-length coded, into units each of which consists of a predetermined number of items of data, and forming a plurality of types of code groups corresponding to the luminance signals and the color difference signals of image data; and combining and outputting the code groups in conformity with an area of the image data.

22. The image coding method according to claim 21, wherein said coding step includes a conversion step for performing an orthogonal transformation of each of the blocks, a quantizing step for quantizing each of the blocks that are orthogonally transformed by said conversion step and an encoding step for encoding each item of quantized data quantized by said quantizing step into encoded data.

23. The image coding method according to claim 22, wherein in said encoding step, each item of the quantized data is encoded by using Huffman encoding.

24. An image coding method for variable-length coding inputted image data, comprising the steps of:

partitioning each of a plurality of types of image signals constituting image data into a plurality of blocks;

coding, at variable lengths, each of the blocks resulting from partitioning at the partitioning step;

gathering coded data, which has been variable-length code, into units each of which consists of a predetermined number of items of data, and forming a plurality of types of code groups corresponding to the plurality of types of image signals;

extracting, in a predetermined sequence, each type of code group of the image signals corresponding to a predetermined area of the image data and packing boundary information between mutually adjacent code groups; and outputting the code groups upon appending at least an error correction code.

25. The method according to claim 24, wherein said coding step comprises coding each of the plurality of types of image signals by a discrete cosine transform.

26. A coding method, comprising the steps of:

inputting luminance data and color-difference data constituting image data representing an image;

variable-length encoding each of said luminance data and said color-difference data independently; and outputting encoded data and an error correction code as one unit, said encoded data including predetermined items of said luminance data and said color-difference data, wherein said luminance data and said color-difference data included in said one unit are obtained from substantially the same area on said image.

27. The method according to claim 26, wherein in said variable-length encoding step, each of the color-difference data constituting image data is encoded by a discrete cosine transform.

* * * * *

UNITED STATES PATENT AND TRADEMARK OFFICE
CERTIFICATE OF CORRECTION

PATENT NO. : 5,566,002
DATED : October 15, 1996
INVENTOR(S) : AKIHIRO SHIKAKURA

It is certified that error appears in the above-identified patent and that said Letters Patent is hereby corrected as shown below:

On the title page, item:

AT [57] ABSTRACT

Line 3, "to" should be deleted.

COLUMN 2

Line 52, "is" should be deleted.
Line 55, "consists" should read --consisting--.
Line 56, "belong to" should read --belonging to a--.

COLUMN 5

Line 23, "40" should not be boldface.
Line 32, "each" (2nd occurrence) should read --each of--
Line 60, "as" should read --as a--.

COLUMN 6

Line 13, "whereby" should read --whereby an--.

COLUMN 7

Line 11, "40" should not be boldface.
Line 13, "320" should not be boldface.
Line 16, "40" should not be boldface.
Line 19, "40" should not be boldface.
Line 28, "4" should not be boldface.
Line 32, "68" should not be boldface.
Line 59, "from one" (2nd occurrence) should be deleted.

UNITED STATES PATENT AND TRADEMARK OFFICE
CERTIFICATE OF CORRECTION

PATENT NO. : 5,566,002
DATED : October 15, 1996
INVENTOR(S) : AKIHIRO SHIKAKURA

It is certified that error appears in the above-identified patent and that said Letters Patent is hereby corrected as shown below:

COLUMN 10

Line 4, "signal," should read --signal;--.
    Line 7, "conversed" should read --conversion--.

COLUMN 12

Line 17, "code," should read --coded,--.

Signed and Sealed this

Twenty-second Day of April, 1997

Attest:

BRUCE LEHMAN

*Commissioner of Patents and Trademarks*

*Attesting Officer*